United States Patent
Stopler

(10) Patent No.: US 7,720,167 B2
(45) Date of Patent: May 18, 2010

(54) POWER SAVE MODE TRANSITION USING LOADING TRANSLATION FUNCTION

(75) Inventor: Danny Stopler, Holon (IL)

(73) Assignee: ST.Microelectronics Ltd., Netanya (IL)

( * ) Notice: Subject to any disclaimer, the term of this patent is extended or adjusted under 35 U.S.C. 154(b) by 1026 days.

(21) Appl. No.: 11/090,510

(22) Filed: Mar. 25, 2005

(65) Prior Publication Data
US 2005/0213405 A1  Sep. 29, 2005

Related U.S. Application Data

(60) Provisional application No. 60/557,802, filed on Mar. 29, 2004.

(51) Int. Cl.
*H04L 5/12* (2006.01)
(52) U.S. Cl. .................. 375/264; 455/450
(58) Field of Classification Search ............. 375/222, 375/260, 264; 455/450
See application file for complete search history.

(56) References Cited

U.S. PATENT DOCUMENTS

| | | | | |
|---|---|---|---|---|
| 5,682,419 | A * | 10/1997 | Grube et al. | 455/450 |
| 6,829,307 | B1 * | 12/2004 | Hoo et al. | 375/260 |
| 6,865,232 | B1 * | 3/2005 | Isaksson et al. | 375/260 |
| 6,870,888 | B1 * | 3/2005 | Shapiro et al. | 375/260 |
| 2004/0001552 | A1 * | 1/2004 | Koifman | 375/260 |
| 2004/0057528 | A1 | 3/2004 | Tzannes | |
| 2005/0058213 | A1 * | 3/2005 | Shapiro et al. | 375/260 |

FOREIGN PATENT DOCUMENTS

WO  WO-02/078244 A1  10/2002

OTHER PUBLICATIONS

ITU-T Recommendation G.992.3 entitled Series G:Transmission Systems and Media, Digital Systems and NEtworks: Digital Sections and Digital Line System—Access Networks; Asymmetric Digital Subscriber Line Transceivers 2 (ADSL2) (international Telecommunication Union, 2002).*

ITU-U Recommendation G.992.3 (hereinafter ITU) (entitled "Series G: Transmission Systems and Media, Digital Systems and Networks. . . . " see IDS).*

Section 8.6 of ITU-T Recommendation G.992.3, entitled Series G: Transmission Systems and Media, Digital Systems and Networks: Digital Sections and Digital Line System—Access Networks; Asymmetric Digital Subscriber Line Transceivers 2 (ADSL2) (International Telecommunication Union, 2002).

* cited by examiner

*Primary Examiner*—David C Payne
*Assistant Examiner*—Leon-Viet Q Nguyen
(74) *Attorney, Agent, or Firm*—D. Kliegler T.P. Services Ltd.

(57) ABSTRACT

Methods and systems provide an efficient power save mode for multi carrier modems, such as DMT based ADSL and VDSL modems. Fast transitions from power save mode to full operational mode occur, without the overhead of transmitting large quantities of configuration information between the transmitter and receiver. Signal constellation size changes occurring while operating in power save mode to continue to apply once full operational mode is resumed. Multiple power save modes are enabled, each having a different level of power dissipation and crosstalk, both far end crosstalk and near end crosstalk. Power dissipation and crosstalk can thus be graduated on a line, according to a user-requested bit rate.

31 Claims, 2 Drawing Sheets

POWER SAVE MODE TRANSITION USING LOADING TRANSLATION FUNCTION

CROSS-REFERENCE TO RELATED APPLICATIONS

This application claims the benefit of U.S. Provisional Patent Application No. 60/557,802, filed Mar. 29, 2004, which is incorporated herein by reference.

BACKGROUND OF THE INVENTION

1. Field of the Invention

The present invention relates generally to high-speed digital communication systems, and specifically to methods for transmission and reception of signals using multicarrier modulation schemes.

2. Description of the Related Art

The meanings of acronyms and certain terminology used herein are given in Table 1.

TABLE 1

| | |
|---|---|
| ADSL | Asymmetric Digital Subscriber Line |
| CO | Central Office |
| CPE | Customer Premises Equipment |
| DMT | Discrete Multitone Modulation |
| DSL | Digital Subscriber Lines |
| FEQ | Frequency Domain Equalizer |
| FEXT | Far End Crosstalk |
| FFT | Fast Fourier Transform |
| IFFT | Inverse Fast Fourier Transform |
| L0 | Full power mode operation |
| L2 | A power save mode of operation. |
| NEXT | Near End Crosstalk |
| PMD | Physical Media Dependent |
| QAM | Quadrature Amplitude Modulation |
| SNR | Signal-to-noise ratio |
| VDSL | Very High Speed Digital Subscriber Line |

In recent years multicarrier modulation has become the main commercial modulation scheme in "last mile solutions", particularly Digital Subscriber Lines (DSL). Multicarrier modulation is also used in various wireless applications. The leading representative for this trend is discrete multitone modulation (DMT), which is successfully employed in both DSL and wireless modems. For example, Asymmetric Digital Subscriber Line (ADSL) uses 256 or 512 tones in a downlink, i.e., from a central office (CO) facility to customer premises equipment (CPE). ADSL standards are described in further detail, for example, in the document, ITU-T Recommendation G.992.3, entitled *Series G: Transmission Systems and Media, Digital Systems and Networks; Digital Sections*, which is herein incorporated by reference.

In one DMT modulation scheme, used in ADSL, N tones are modulated by quadrature amplitude modulation (QAM), using two-dimensional input frequency-domain symbols. A 2N-point inverse fast Fourier transform (IFFT) then produces a corresponding time-domain symbol, expressed as a real baseband time-domain output signal of 2N real samples in each symbol period. At the receiving side, 2N samples are extracted from the time-domain signal during each symbol period. A fast Fourier transform (FFT) is used to demodulate the signal and recover the original QAM symbols on the N tones.

The number of bits to be encoded by each tone, known as bit loading or bit allocation, is determined by the receiver according to line conditions, which are measured as a function of frequency during a training period. The bit loading value for each tone may take any value from zero up to a preset maximum. The receiver passes a table of these values, known as a bit loading table or bit allocation table, to the transmitter, which thus determines how many bits of the input data stream to allocate to each successive tone in the tone order.

In order to achieve higher bit rates using multicarrier multitone techniques, more tones are needed. For example, DMT has been proposed for Very High Speed Digital Subscriber Line (VDSL) modems using 4096 tones or subcarriers. Since, in multicarrier modulation, each subcarrier sees a different slice of the channel, the modulation parameters used for each subcarrier are typically different. For example, the number of bits that can be conveyed or loaded per symbol, i.e., for a given carrier constellation size, is different for each of the carriers. The number of bits per tone is held in the bit loading table. Moreover, the optimal power allocation among the subcarriers (also known as per carrier gain) is not flat. The gain per tone is held in a gain table. In order for the multicarrier scheme to operate, both the bit allocation table and the gain table are typically computed by a receiver, and transferred from time to time from the receiver to a transmitter. In the case of the large number of tones employed in VDSL, these tables are so large that they burden the multicarrier scheme.

In the case of ADSL, a power save mode (L2 mode) was included in the above-noted ITU-T Recommendation G.992.3. The L2 mode uses an online reconfiguration mechanism to allow the central office and consumer premise equipment to negotiate a lower data rate, which the CPE can achieve using a lower average transmit gain level from the CO, with a new bits and gains table defined by the CPE. A reduction in the average gain level translates into a reduction in the average transmit power, allowing the CO to save power. This scheme provides for a reduction in the power consumption of the central office modem, by at most six dB. There is no provision for reduction of the modem power consumption at the customer site.

The above noted technical obstacles indicate the need for improvements in power saving modes of operation in multicarrier modulation schemes. Previous proposed solutions unfortunately sacrifice channel utilization, e.g. by requiring symbol duplication in the case of VDSL, which reduces bit rate unacceptably. Channel utilization is not sacrificed when the principles of the invention are applied.

SUMMARY OF THE INVENTION

According to a disclosed embodiment of the invention, methods and systems provide an efficient power save mode for multicarrier modems, e.g., DMT-based ADSL and VDSL modems. Fast transitions from power save mode to full operational mode occur without the overhead of transmitting large quantities of line configuration information between the transmitter and receiver. Signal constellation size changes occurring while operating in power save mode continue to apply once full operational mode is resumed. Multiple power save modes are enabled, each having different levels of power dissipation and crosstalk, both far end crosstalk (FEXT) and near end crosstalk (NEXT). Power dissipation and crosstalk can thus be graduated, according to a user-requested bit rate.

The invention provides a method for communication between a transmitter and a receiver using multi-carrier modulation at different power levels, which is carried out by establishing at the receiver a first bit allocation table containing respective first bit loading values for a plurality of subcarriers while the subcarriers are transmitted at respective first power levels, communicating the first bit allocation table from the receiver to the transmitter, defining a loading translation function indicative of second bit loading values to be derived from the first bit loading values when the subcarriers are transmitted at respective second power levels. Responsively to a request by the transmitter to operate at the second respective power levels, the method is further carried out by establishing the second bit loading values for the subcarriers in accordance with the loading translation function, and transmitting the subcarriers from the transmitter to the receiver at the respective second power levels using the second bit loading values in the subcarriers.

An additional aspect of the method includes establishing a gain table for the subcarriers, and transmitting the subcarriers at the respective first power levels and at the respective second power levels in accordance with the gain table.

According to one aspect of the method, the respective second power levels are reduced by a constant proportion from the respective first power levels.

According to one aspect of the method, the constant proportion is six dB.

According to one aspect of the method, the constant proportion is three dB.

According to another aspect of the method, the loading translation function is represented as a lookup table.

According to another aspect of the method, in the lookup table each of the first bit loading values are associated with a predetermined one of the second bit loading values.

According to a further aspect of the method, the loading translation function is determined in accordance with signal-to-noise ratios that are associated with respective ones of the first bit loading values.

A further aspect of the method includes transmitting a pseudorandom bit sequence in those subcarriers that are assigned a bit allocation value of zero by the loading translation function.

Yet another aspect of the method is carried out while transmitting the subcarriers from the transmitter to the receiver at the respective second power levels. The method is further carried out at the receiver by preparing respective new bit loading values and respective new gain values for the subcarriers, communicating the respective new bit loading values and the respective new gain values to the transmitter, and thereafter transmitting the subcarriers a second time at the respective first power levels using the respective new bit loading values and the respective new gain values.

According to still another aspect of the method, defining the loading translation function includes defining third bit loading values to be derived from the first bit loading values when the subcarriers are transmitted at respective third power levels, which are reduced from the respective first power levels by a different proportion from the respective second power levels, and where the transmitter and the receiver are adapted to operate at either of the second power levels or and the third power levels using the second bit loading values or the third bit loading values, respectively.

The invention provides a communications system, including a transmitter that is connectable to a receiver. Data is communicated therebetween using multi-carrier modulation at different power levels. The transmitter is operative to receive from the receiver a first bit allocation table containing respective first bit loading values for a plurality of subcarriers while the subcarriers are transmitted at respective first power levels. The transmitter is further operative for defining a loading translation function indicative of second bit loading values to be derived from the first bit loading values when the subcarriers are transmitted at respective second power levels. Responsively to a request by the transmitter to operate at the respective second power levels, the transmitter is operative for receiving from the receiver the second bit loading values for the subcarriers in accordance with the loading translation function, and transmitting the subcarriers from the transmitter to the receiver at the respective second power levels using the second bit loading values in the subcarriers.

The invention provides a communications system, including a receiver connectable to a transmitter. Data is communicated therebetween using multi-carrier modulation at different power levels. The receiver operative for establishing a first bit allocation table containing respective first bit loading values for a plurality of subcarriers while the subcarriers are received from the transmitter at respective first power levels, communicating the first bit allocation table from the receiver to the transmitter, defining a loading translation function indicative of second bit loading values to be derived from the first bit loading values when the subcarriers are transmitted at respective second power levels. Responsively to a request by the transmitter to operate at second respective power levels, the receiver is operative for establishing the second bit loading values for the subcarriers in accordance with the loading translation function, and communicating the second bit loading values to the transmitter. The receiver is further operative for receiving the subcarriers from the transmitter at the respective second power levels using the second bit loading values in the subcarriers.

BRIEF DESCRIPTION OF THE DRAWING

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
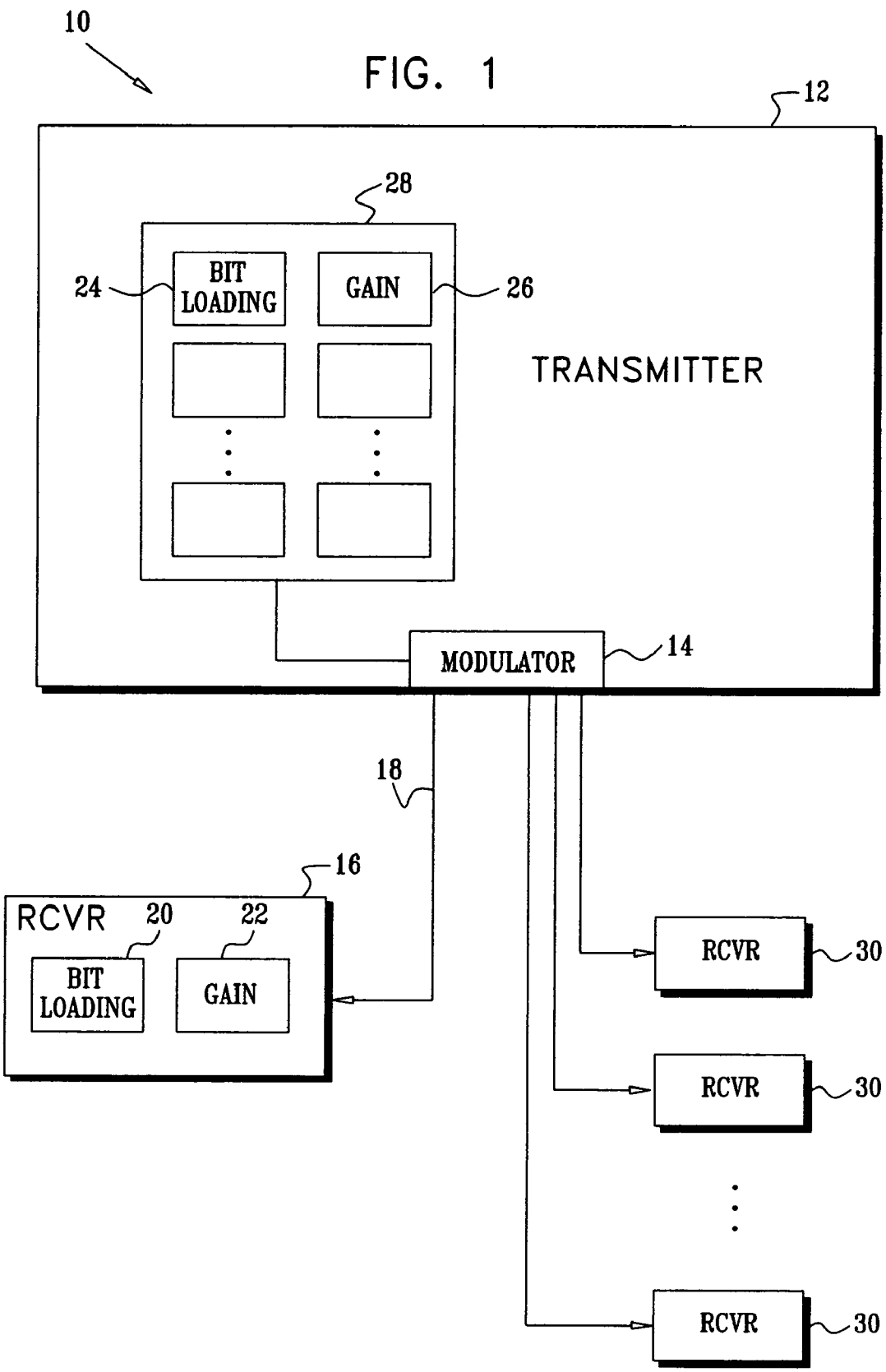
FIG. 1 is a block diagram illustrating a communication system employing multicarrier modulation that is constructed and operative in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to obscure the present invention unnecessarily.

There are a number of drawbacks to the L2 mode, which become even more apparent when it is implemented in VDSL: both the CO and CPE need to maintain two downstream bit allocation and gains tables to support full power mode (L0 mode) and L2 mode. If L2 mode were to be implemented in the upstream direction, then two additional sets of tables would be needed. This requirement would double the memory requirements for the tables, which can be burdensome in the case of VDSL, using 4096 subchannels.

Currently, entry into L2 mode requires an exchange of bit allocation and gain information for 4096 subchannels in the case of VDSL, using an overhead channel. The process is time-consuming, and requires considerable memory and computer processing resources.

While in L2 mode, characteristics of the subchannels may change, ideally requiring adjustment of the bit allocation and gains. However, such adjustments are not allowed by the current ADSL standard. Therefore, in order to operate in L2 mode for protracted intervals, the modems must occasionally exit the L2 mode, update the bit allocation and gains tables, and re-enter L2 mode. This is undesirable, as the transitions between full power mode and reduced power mode may produce variations in cross channel modulation and interfere with other users.

The set of subchannels used in L2 mode may be smaller than the number used in certain modes of operation, e.g., Showtime. On subchannels that are used in modes such as Showtime but are not used in L2 mode, equalizers such as frequency domain equalizer (FEQ) either cannot be updated, or can be updated only by use of a known training signal to be sent on those subchannels. The latter introduces additional complexity, and increases power requirements.

Optimally, to maintain accurate information transmission when switching between L0 and L2 modes, new bit allocation and gains tables would be recreated, as in initialization of the channel, but with a lower target rate. However, this process is costly in terms of processing resources and memory. Furthermore, framing parameters may need to be reconfigured for the new data rate in L2 mode.

The above noted L2 standard provides limited power savings at the central office, and limits crosstalk to an acceptable level. However, according to the invention, assuming receivers can be informed of potential changes in transmission power, and react to them in a timely manner, the transmission power may be changed over a wider range e.g., 12, 18 or even 24 dB. As the transmission power decreases, crosstalk, both NEXT and FEXT, are progressively decreased. This effect enables higher bit rates than would have been possible at lower power, had crosstalk not decreased. With the flexibility of varying transmission power, the dual advantages of higher channel utilization and lower power dissipation can be achieved. When the CPE acts as a transmitter, enabling it to employ variable power reduction benefits the customer as well as the central office facility. Indeed, in the case of modems capable of very high bit rates, e.g., VDSL modems, full power operation could become the exception, rather then being the default mode. Maximum bit rate may be intermittently required in typical commercial use, generally for relatively short intervals. Thus, such modems may operate most of the time in a power save mode, reverting to full power operation only when needed. However, achieving this desired state requires reasonably efficient channel utilization in power save modes.

Currently, in order to efficiently implement L2 mode, two pairs of bit allocation and gain tables are maintained. One pair contains the bit allocation and gain tables for full power operation. The second set contains corresponding tables for reduced power mode. For both modes of operation, the gain and bit allocation tables are optimized for the actual transmission power used.

During initialization, a physical media dependent (PMD) receive function is used to calculate the numbers of bits and the relative gains to be used for every subcarrier, as well as the order in which subcarriers are assigned bits, i.e., the tone ordering. The calculated bit allocations and gains and the tone ordering are subsequently used in a PMD transmit function. Typically, the bit allocation and gain tables are computed at the receiver and sent to the transmitter over the communication link, e.g., an overhead channel. More specifically, the pairs of bits and relative gains are defined, in ascending order of frequency or subcarrier index i, as a bit allocation table b and gain table 9, i.e., $b_i$ and $g_i$, for i=1 to NSC−1, with $b_1$ bits to be allocated to subcarrier 1 and $b_{NSC}$−1 bits to be allocated to subcarrier NSC−1. If trellis coding is used, the PMD function must enter an even number of 1-bit subcarriers in the bit allocation table b.

Power save mode seems attractive for high bit rate multicarrier modems, since they mostly operate in power save mode. However, as noted above, the large number of tones used in multicarrier modulation, e.g., 4096 tones in VDSL DMT, requires maintaining multiple sets of very large loading and gain tables. Not only does this require a large amount of memory, but more importantly, considerable communication bandwidth is consumed in transferring the tables and their updates from receiver to transmitter. This difficulty is solved by the instant invention, which provides a simple way to enable fast power and loading changes among several power save modes, while maintaining only a single master loading table. A flat power reduction, e.g., 6 dB, is applied to all subcarriers. In addition, a simple mechanism to translate the master bit allocation table to the power save bit allocation table is used. The master bit allocation table applies to full power mode, and as noted above, is held in both the receiver and the transmitter. A corresponding bit allocation table in each power save mode is derived from the master table by the receiver. To enable a transition into a power save mode, the receiver sends a loading translation function to the transmitter. For each of the possible bit loading values in the master table, the loading translation function specifies a new bit loading to be used in the power save mode, without changing the per tone gain. The per tone gain is intentionally kept the same for full power operational mode and the power save modes to simplify mode transitions.

Assuming the possible bit loading values are $L_0 \ldots L_N$, for each master loading value $L_M$, the translation function $f_{TRANS}: L_0 \ldots L_N \rightarrow \Lambda_0 \ldots \Lambda_N$ defines a new power save loading value $\Lambda_S$. Thus, $f_{TRANS}$ is defined from the domain $L_0 \ldots L_N$ to the range $\Lambda_0 \ldots \Lambda_N$. Note that for all tones having the same bit loading value in the master table, the translation function $f_{TRANS}$ produces identical corresponding values in the power save mode bit allocation table.

System Architecture.

Turning now to the drawings, reference is initially made to FIG. 1, which is a block diagram illustrating a communication system 10 employing multicarrier modulation that is constructed and operative in accordance with a disclosed embodiment of the invention. A transmitter 12 includes a modulator 14 that transmits information to a receiver 16 over a communications link 18 using a plurality of subcarriers, and using a known multicarrier modulation technique. A bit allocation table 20 and a gain table 22 are prepared by the receiver 16, and copied to the transmitter 12. The transmitter 12 maintains the copies as a bit allocation table 24 and a gain table 26 in a master loading table 28 that includes similar tables for other receivers 30 to which it transmits. Power and bit loading values for the transmitted subcarriers are governed by the bit allocation table 24 and the gain table 26.

The receiver 16 is capable or communicating with the transmitter 12 over the link 18 or alternatively via a different channel (not shown).

When the receiver 16, during either full power mode or power save mode, computes or recomputes bit-loading and gains, the computation is performed using the full power line characteristics. The receiver 16 then sends only the new bit loading values to the transmitter 12. The transmitter 12 updates its master loading table 28 with the new version of the bit allocation table 20 and the gain table 22. Then the transmitter 12 applies the loading translation function for the receiver 16 to the modified master loading table 28, to obtain the power save loading values. This enables the transmitter to vary the bit allocation very quickly, whenever there is a transition between full power mode and different power save modes, since it only needs to apply a new loading translation function to obtain a desired bit allocation. The function may be conveniently represented as a lookup table, so that the bit loading results are almost immediately obtained. The receiver 16 uses the same lookup table to reconstruct the bit allocation table 20. The look up table is determined by the receiver 16 based on various parameters, e.g., desired power cut-back, minimal and maximal rates in power save mode. As noted above, the gain table 22 does not change in different power save modes.

During power save mode, some of the tones may reduce to zero bit loading. However in order to enable fast transition back to full power mode, the receiver 16 needs to continue adapting the frequency equalizer (FEQ) for the zero loading tones, so that the FEQ can maintain lock. This implies that the zero loading tones must still be transmitted. However, they are modulated using a pseudorandom bit sequence instead of data.

Using the scheme described above, bitswaps can be allowed in L2 mode, in order to remain in L2 mode for long intervals, despite changes in the characteristics of the link 18. These bitswaps are directed toward the L0 tables. The updates then influence the L2 tables thorough the mapping function.

Bitswaps are initiated by the receiver as a response to a change in line conditions, e.g., increase or decrease in the SNR of a certain tone. In response to the change of line conditions, the receiver calculates a new loading and gain value for one or more tones and transmits the new values to the transmitter, to be implemented at an agreed time. In this way, the receiver tries to maintain constant a probability of error over all tones. Alternatively, other criteria, e.g., variation in noise margin, can be selected as an indication for a bitswap.

In cases where the modem is operating in L0 mode, new loading and gain tables are derived by updating the corresponding entries of current L0 tables. If L2 mode is currently in operation, the L0 tables are initially updated. Then corresponding entries in the L2 tables are calculated by implementing the transformations defined in the lookup table.

Operation.

Figure 2:
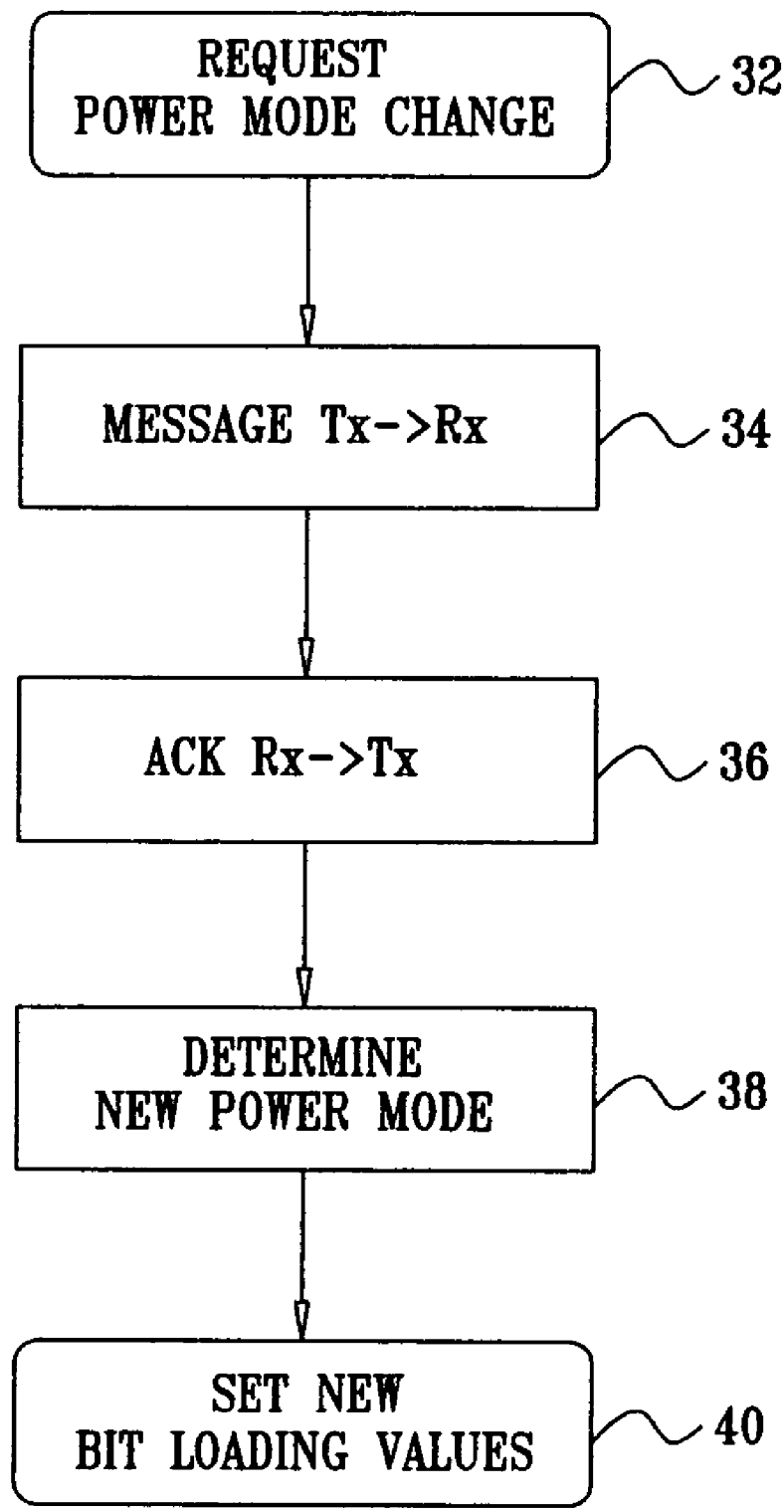
FIG. 2 is a flow chart illustrating a method for performing a transition between two different power transmission modes in accordance with a disclosed embodiment of the invention.

Reference is now made to FIG. 2, which is a flow chart illustrating a method for performing a transition between two different power transmission modes, in accordance with a disclosed embodiment of the invention. It is assumed that the network protocol provides for messaging between transmitter and receivers, and that a lookup table representing the function $f_{TRANS}$ for the receiver has previously been prepared, as described above. Many of the functions described below are assigned to a member of a pair comprising of a receiver or a transmitter. It will be appreciated that these functions may be equally performed by the other member of the pair.

At initial step 32 a power save mode change is initiated at the instance of the transmitter, for example based upon data traffic analysis or a command from a higher level of control. The request by itself can be either general without setting any goals, or can include goals for power or/and rate reduction.

Next, at step 34, a notification is sent to the receiver, and, step 36, an acknowledgement is received by the transmitter from the receiver.

Next, at step 36, the transmitter determines the effective flat power cutoff for all tones to be applied, depending on the nature of the request in initial step 32. In some implementations, different gains are associated with different loading values, using a second lookup table to assign different power cutbacks to a particular loading values.

Next, at step 38, using the lookup table, new bit-loading values are applied to the tones as a translation function of the old loading value. This function is obtained from predetermined power save bit loading values corresponding to each original bit loading value. In the example of Table 2, all tones that had a bit loading value of 3 in full-power mode will have a new bit loading of 2 in a power-save mode with 3 dB power reduction for each subcarrier and a new bit loading of 1 in another power-save mode with six dB power reduction for each subcarrier. The translation function can be represented simply as a vector of the values in the corresponding column in Table 2. For example, in the case of a three dB power save, the function would be represented as the vector <0, 0, 2, 2, 3, 5, 5.>.

Next, at final step 40, the transmitter begins transmitting in the new power transmission mode at a specified time across all tones. Using the bit-loading values determined in step 38. The time can be specified in many ways. For example, it could be specified in the message sent in step 34, in the acknowledge message at step 36, or by calculation based in the initiation in initial step 32.

In some applications the transmitter can immediately indicate to the receiver that it has resumed L0 mode operation, and has returned to the original table. In other implementations, modifications of the original table are allowed to be made by the receiver. This permits the receiver to adaptively change the bit loading and gain while operating in power save mode. The changes are communicated to the transmitter, and they become applicable by the transmitter in full power mode, once it has resumed. Low power tables based on a current application either can be updated immediately based on the current lookup table or can remain unchanged until a new lookup table is sent to the receiver. In the latter case, the new lookup table is applied to produce the updated table.

EXAMPLE 1

Table 2 shows how a SNR requirement in a receiver loading algorithm, used in a master bit allocation table, may be used to generate translation functions for two different power save modes.

TABLE 2

| Loading | SNR assumption by receiver for master table | Loading After 3 dB power reduction | Loading After 6 dB power reduction |
|---|---|---|---|
| 1 | 11.3576 | 0 | 0 |
| 2 | 14.3190 | 0 | 0 |
| 3 | 18.2520 | 2 | 1 |
| 4 | 21.2184 | 2 | 2 |
| 5 | 23.9646 | 3 | 2 |
| 6 | 27.3706 | 5 | 4 |
| 7 | 30.2396 | 5 | 5 |

The translation function is highly flexible, while at the same time requiring a small message size or footprint, e.g. (N+1) bytes. Flexibility is needed since the translation function may differ for every receiver. The small footprint allows rapid communication of the translation function very fast, with minimal overhead. In the case of this example, the entire translation function can be communicated in seven bytes for each power save scheme. In contrast, a much larger bit allocation table would be required to be transmitted conventionally.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for communication between a transmitter and a receiver using multi-carrier modulation at different power levels, comprising the steps of:
    at said receiver establishing a bit allocation table containing respective first bit loading values $L_S$ selected from a set of possible first bit loading values $L_0 \ldots L_N$, for a plurality of subcarriers while said subcarriers are transmitted at respective first power levels;
    communicating said bit allocation table from said receiver to said transmitter;
    defining a loading translation function $f_{TRANS}$: $L_0 \ldots L_N \to \Lambda_0 \ldots \Lambda_N$ such that $f_{TRANS}(L_S)=\Lambda_S$ defines, for each first bit loading value $L_S$, a respective second bit loading value $\Lambda_S$ selected from a set of possible second bit loading values $\Lambda_0 \ldots \Lambda_N$ to be used when said subcarriers are transmitted at respective second power levels,
    wherein said loading translation function specifies a single new bit loading value corresponding to each given original bit loading value in said bit allocation table, such that all said subcarriers having said given original bit loading value in said bit allocation table will have an identical corresponding new bit loading value after application of said loading translation function;
    responsively to a request by said transmitter to operate at said respective second power levels, establishing said second bit loading values for said subcarriers in accordance with said loading translation function; and
    transmitting said subcarriers from said transmitter to said receiver at said respective second power levels using said second bit loading values in said subcarriers.

2. The method according to claim 1, further comprising the steps of:
    establishing a gain table for said subcarriers; and
    transmitting said subcarriers at said respective first power levels and at said respective second power levels in accordance with said gain table.

3. The method according to claim 1, wherein said respective second power levels are reduced by a constant proportion from said respective first power levels, such that the second power levels of all the subcarriers are reduced by an equal number of dB relative to the respective first power levels.

4. The method according to claim 3, wherein said constant proportion is 6 dB.

5. The method according to claim 3, wherein said constant proportion is 3 dB.

6. The method according to claim 1, wherein said loading translation function is represented as a lookup table.

7. The method according to claim 6, wherein in said lookup table each of said first bit loading values are associated with a predetermined one of said second bit loading values.

8. The method according to claim 6, wherein said loading translation function is determined in accordance with signal-to-noise ratios that are associated with respective ones of said first bit loading values.

9. The method according to claim 1, further comprising the step of transmitting a pseudorandom bit sequence in ones of said subcarriers that are assigned a bit allocation value of zero by said loading translation function.

10. The method according to claim 1, further comprising the steps of:
    while performing said step of transmitting said subcarriers from said transmitter to said receiver at said respective second power levels, at said receiver preparing respective new bit loading values and respective new gain values for said subcarriers;
    communicating said respective new bit loading values and said respective new gain values to said transmitter; and
    thereafter transmitting said subcarriers a second time at said respective first power levels using said respective new bit loading values and said respective new gain values.

11. The method according to claim 1, wherein defining said loading translation function comprises defining third bit loading values to be derived from said first bit loading values when said subcarriers are transmitted at respective third power levels, which are reduced from said respective first power levels by a different proportion from said respective second power levels, and where said transmitter and said receiver are adapted to operate at either of said second power levels or and said third power levels using said second bit loading values or said third bit loading values, respectively.

12. A communications system, comprising:
    a transmitter connectable to a receiver, data being communicated therebetween using multi-carrier modulation at different power levels, said transmitter being operative to perform the steps of:
    receiving from said receiver a bit allocation table containing respective first bit loading values $L_S$ selected from a set of possible first bit loading values $L_0 \ldots L_N$ for a plurality of subcarriers while said subcarriers are transmitted at respective first power levels;
    receiving a loading translation function $f_{TRANS}$: $L_0 \ldots L_N \to \Lambda_0 \ldots \Lambda_N$ such that $f_{TRANS}(L_S)=\Lambda_S$ defines, for each first bit loading value $L_S$, a respective second bit loading value $\Lambda_S$ selected from a set of possible second bit loading values $\Lambda_0 \ldots \Lambda_N$ to be used when said subcarriers are transmitted at respective second power levels,
    wherein said loading translation function specifies a single new bit loading value corresponding to each given original bit loading value in said bit allocation table, such that all said subcarriers having said given original bit loading value in said bit allocation table will have an identical corresponding new bit loading value after application of said loading translation function;
    responsively to a decision by said transmitter to operate at said respective second power levels, establishing said second bit loading values for said subcarriers in accordance with said loading translation function; and
    transmitting said subcarriers from said transmitter to said receiver at said respective second power levels using said second bit loading values in said subcarriers.

13. The communications system according to claim 12, said transmitter further being operative to perform the steps of: establishing a gain table for said subcarriers;
    and transmitting said subcarriers at said respective first power levels and at said respective second power levels in accordance with said gain table.

14. The communications system according to claim 12, wherein said respective second power levels are reduced by a constant proportion from said respective first power levels, such that the second power levels of all the subcarriers are reduced by an equal number of dB relative to the respective first power levels.

15. The communications system according to claim 14, wherein said constant proportion is 6 dB.

16. The communications system according to claim 14, wherein said constant proportion is 3 dB.

17. The communications system according to claim 12, wherein said loading translation function is represented as a lookup table.

18. The communications system according to claim 17, wherein in said lookup table each of said first bit loading values are associated with a predetermined one of said second bit loading values.

19. The communications system according to claim 17, wherein said loading translation function is determined in accordance with signal-to-noise ratios that are associated with respective ones of said first bit loading values.

20. The communications system according to claim 12, said transmitter being operative to transmit a pseudorandom bit sequence in ones of said subcarriers that are assigned a bit allocation value of zero by said loading translation function.

21. The communications system according to claim 12, said transmitter further being operative to perform the steps of:
while performing said step of transmitting said subcarriers at said respective second power levels, obtaining from said receiver respective new bit loading values and respective new gain values for said subcarriers;
thereafter transmitting said subcarriers a second time at said respective first power levels using said respective new bit loading values and said respective new gain values.

22. The communications system according to claim 12, wherein defining said loading translation function comprises defining third bit loading values to be derived from said first bit loading values when said subcarriers are transmitted at respective third power levels, which are reduced from said respective first power levels by a different proportion from said respective second power levels, and where said transmitter and said receiver are adapted to operate at either of said second power levels or and said third power levels using said second bit loading values or said third bit loading values, respectively.

23. A communications system, comprising:
a receiver connectable to a transmitter, data being communicated therebetween using multi-carrier modulation at different power levels, said receiver operative to perform the steps of:
establishing a bit allocation table containing respective first bit loading values $L_S$ selected from a set of possible first bit loading values $L_0 \ldots L_N$, for a plurality of subcarriers while said subcarriers are being received from said transmitter at respective first power levels;
communicating said bit allocation table from said receiver to said transmitter;
defining a loading translation function $f_{TRANS}$: $L_0 \ldots L_N \rightarrow \Lambda_0 \ldots \Lambda_N$ such that $f_{TRANS}(L_S)=\Lambda_S$ defines, for each first bit loading value $L_S$, a respective second bit loading value $\Lambda_S$ selected from a set of possible second bit loading values $\Lambda_0 \ldots \Lambda_N$ to be used when said subcarriers are transmitted at respective second power levels,
wherein said loading translation function specifies a single new bit loading value corresponding to each given original bit loading value in said bit allocation table, such that all said subcarriers having said given original bit loading value in said bit allocation table will have an identical corresponding new bit loading value after application of said loading translation function;
responsively to a request by said transmitter to operate at second respective power levels, establishing said second bit loading values for said subcarriers in accordance with said loading translation function; and
receiving said subcarriers from said transmitter at said respective second power levels using said second bit loading values in said subcarriers.

24. The communications system according to claim 23, said receiver further being operative to perform the steps of:
establishing a gain table for said subcarriers; and
receiving said subcarriers at said respective first power levels and at said respective second power levels in accordance with said gain table.

25. The communications system according to claim 23, wherein said respective second power levels are reduced by a constant proportion from said respective first power levels, such that the second power levels of all the subcarriers are reduced by an equal number of dB relative to the respective first power levels.

26. The communications system according to claim 25, wherein said constant proportion is 6 dB.

27. The communications system according to claim 25, wherein said constant proportion is 3 dB.

28. The communications system according to claim 23, wherein said loading translation function is represented as a lookup table.

29. The communications system according to claim 28, wherein in said lookup table each of said first bit loading values are associated with a predetermined one of said second bit loading values.

30. The communications system according to claim 28, wherein said loading translation function is determined in accordance with signal-to-noise ratios that are associated with respective ones of said first bit loading values.

31. The communications system according to claim 23, said receiver being operative to receive a pseudorandom bit sequence in ones of said subcarriers that are assigned a bit allocation value of zero by said loading translation function.

* * * * *